Inventor:
William W. Headings
By Joseph R. Dwyer
Atty.

United States Patent Office 2,884,902
Patented May 5, 1959

2,884,902

HYDRAULIC POWER TOOLS

William W. Headings, Willoughby, Ohio, assignor to Borg-Warner Corporation, Chicago, Ill., a corporation of Illinois Application March 23, 1956, Serial No. 573,381

5 Claims. (Cl. 121—33)

My invention relates to power tools, and more particularly, to fluid operated hand power tools, such as drills, saws, grinders, speed nut wrenches, hedge shears or trimmers, and the like.

Fluid operated power tools, while broadly not new, have not found wide-spread acceptance because they are generally heavy, large, bulky and relatively complex in construction. However, where a source of fluid pressure is readily available, as for example, from fluid pumps incorporated in tractors or the like, there is a demand for fluid operated tools which, while not possessing the aforementioned drawbacks, are portable, light weight, easy to handle and simple in construction. By my invention, such a fluid operated power tool is provided, which may take the form of a complete tool unit incorporating the necessary fluid operated motor and associated fluid control system, or a power and control unit provided with a fluid motor and an associated fluid control system to which a great number of different tool attachments may be easily connected and disconnected. The latter, in addition to the enumerated desirable features, is very versatile, since only one such unit is required for a variety of various power tool attachments. Therefore, the principal object of my invention is the provision of an improved fluid operated power tool.

Another object of my invention is the provision of a unit incorporating a fluid control system and a fluid operated motor to which a great number of different tool elements may be easily connected and disconnected for providing a variety of power tools.

In each of the embodiments of my invention, the fluid control system includes a simple thumb operated on-off control valve means and a fluid pressure valve means, flow control valve means and a fluid pressure valve means, the two valve means being so arranged to co-act and provide for relief of fluid pressure from the tool when and if the tool unit becomes snagged momentarily and is unable to rotate or reciprocate, thereby preventing the destruction of or harmful effects to the driving mechanism. In the power and control unit incorporating the fluid operated motor and the control system, the fluid pressure control valve means may be so arranged to be automatically set for a desired pressure depending upon the particular tool attachment attached to the unit.

Therefore, a still further object of my invention is to provide a fluid power and control means having a fluid control system for a fluid operated power tool incorporating an on-off-fluid control valve and a fluid pressure control valve co-acting in such a manner that fluid pressure is released upon momentary snagging of the particular tool in use.

Another object of my invention is to provide for an automatic setting of a fluid pressure control valve means in a fluid operated power tool, so as to provide a flow of fluid at a predetermined pressure to the tool power means.

A still further object of my invention is to provide a fluid operated power tool which is completely portable, light in weight, easy to handle, and relatively simple in construction.

In one embodiment of my invention, I provide, in the power unit itself, means for reversing the direction of fluid flow, so that the direction of rotation of the particular tool attachment may be reversed at will or rendered inoperative. Also in this embodiment, there is provided, in the power unit, a speed control valve means cooperative with a flow control valve in the source of fluid pressure to regulate the quantity of fluid supplied to the fluid motor, so that the speed of rotation of the tool may be adjusted to any desired value and maintained at the desired speed at any load.

Theerfore, a still further object of my invention is the provision of a fluid operated power tool unit incorporating means to reverse or stop fluid flow to the fluid motor and a speed control valve for adjusting the quantity of fluid flow to the motor.

These and other objects of my invention will become apparent from the following description when taken together with the drawings wherein the same reference character is employed to refer to the same part and in which.

Referring now to Figures 1 to 4, there is illustrated a power and control unit, indicated in its entirety at 10, for connection to and disconnection from various tool attachments, which includes a fluid motor 11, an on-off-flow control valve means 12 and a fluid pressure control valve means 13. The motor and both valve means are enclosed in a housing 14 comprising a body member 15 and a cover member 16 connected by suitable means, such as bolts 17 (only one of which is shown). The body member 15 is formed with a hand grip portion 18 and is bored to provide parallel intersecting chambers 19 and 20 to receive the intermeshing gears 21 and 22, respectively, of the fluid motor 11. Bores 23 and 24 are provided concentric to and intersecting the bores 19 and 20, respectively, to receive the axially extending gear shafts 25 and 26, respectively, each of which is surrounded by an anti-friction needle bearing 27. The cover member 16 is provided with bores 28 and 29 corresponding to the bores 23 and 24 to receive the other ends of the axially extending gear shafts 25 and 26, respectively, each of which is likewise surrounded by an anti-friction needle bearing 27. The shaft 26 extends through the cover member 16 to a position outside the housing 14, and is formed with a splined portion 30 at its outer terminal end, for a purpose to be described. A suitable O-ring sealing means 31 is provided around the shaft 26 and within the cover member 16 to provide a fluid tight seal.

The body member 15 is provided with a fluid inlet passage 32 leading into an inlet chamber or cavity 33, and a fluid outlet passage 34 which communicates with an outlet chamber or cavity 35, the end wall 36 of which is attached to the body member by suitable means, such as bolts 37. A gasket 38 is disposed between the wall 36 and the body member 15 to provide a fluid tight joint. The passages 32 and 34 are internally screw-threaded, as shown (see Figure 2), to receive suitable fittings on inlet and outlet hoses, respectively, leading from and to a source of fluid pressure, such for example, a pump on a tractor or the like.

A fluid inlet conduit 39 communicates with the inlet chamber or cavity 33 and a motor inlet chamber 40 (see Figures 2 and 3) for the passage of controlled fluid pressure to the intermeshing gears 21 and 22. A fluid outlet passage 41 communicates, at the opposite sides of the gears 21 and 22, with a motor outlet chamber 42 and the outlet chamber or cavity 35, for the discharge of fluid from the motor.

Means are provided for relief of fluid which may escape around the axially extending gear shafts 25 and 26, which comprises a passage 43 formed in the cover member 16 and providing communication between the bores 28 and 29. The passage is closed at its outer extremity by means of a screw-threaded plug 44. Also, passages 45 and 46 are provided in the body member 15 and communicate at one end with the bores 23 and 24, respectively, and at their opposite ends intersect and communicate with a passage 47. The axially extending shaft 25 is bored, as at 25', to provide communication between the passages 43 and 47 (by means of the passage 45). A passage 48 communicates the passage 47 with the motor outlet chamber 42, as illustrated (see Figure 2). A relief valve, indicated at 49 (see Figure 2), is disposed within the passage 47 and comprises a sleeve member 50 disposed within the passage 47, providing a seat 51 for a ball 52 resiliently seated thereon by means of a compression spring 53 bearing at its opposite end on a screw-threaded plug member 54 closing off the passage 47. When the fluid pressure in the passage 47 becomes sufficiently great, the ball will be unseated and fluid in the passage will be discharged into the chamber 42 and will then flow to outlet.

The on-off-flow control valve means 12 comprises a stem member 55 received in a bore 56 in the hand grip portion 18 of the body member 15 and is formed of two different diameters to provide a shoulder 57 therebetween. The stem member 55 comprises a first portion 58 having its terminal end extending to a position outside the housing 14 and of a diameter substantially the same as the largest diameter of the bore 56, a second portion 59 of a diameter substantially the same as a smaller diameter of the bore 56, and a third portion 60 of a still smaller diameter. The juncture of the stem portions 58 and 59 form a shoulder 61, and the juncture of the portions 59 and 60 are defined by a conical-shaped surface 62. A coil spring 63 is disposed around the stem portion 59 and between the shoulders 57 and 61 to resiliently urge the stem member 55 to its position shown in Figure 1. The stem portion 58 is slotted as at 64 to slidably receive a pin 65 fixed in the hand grip portion 18, so as to limit the extent of the upward and downward movement of the stem member 55. A suitable O-ring seal 66 is disposed in a groove in the stem member 55 to prevent the leakage of fluid therearound. Also, the stem member is bored, as at 67, to provide communication between the bore 56 and the outlet chamber or cavity 35 for relief of fluid within bore 56 when stem 55 is distended as otherwise there would be a fluid-lock.

Figures 1, 1A, 1B, 1C:
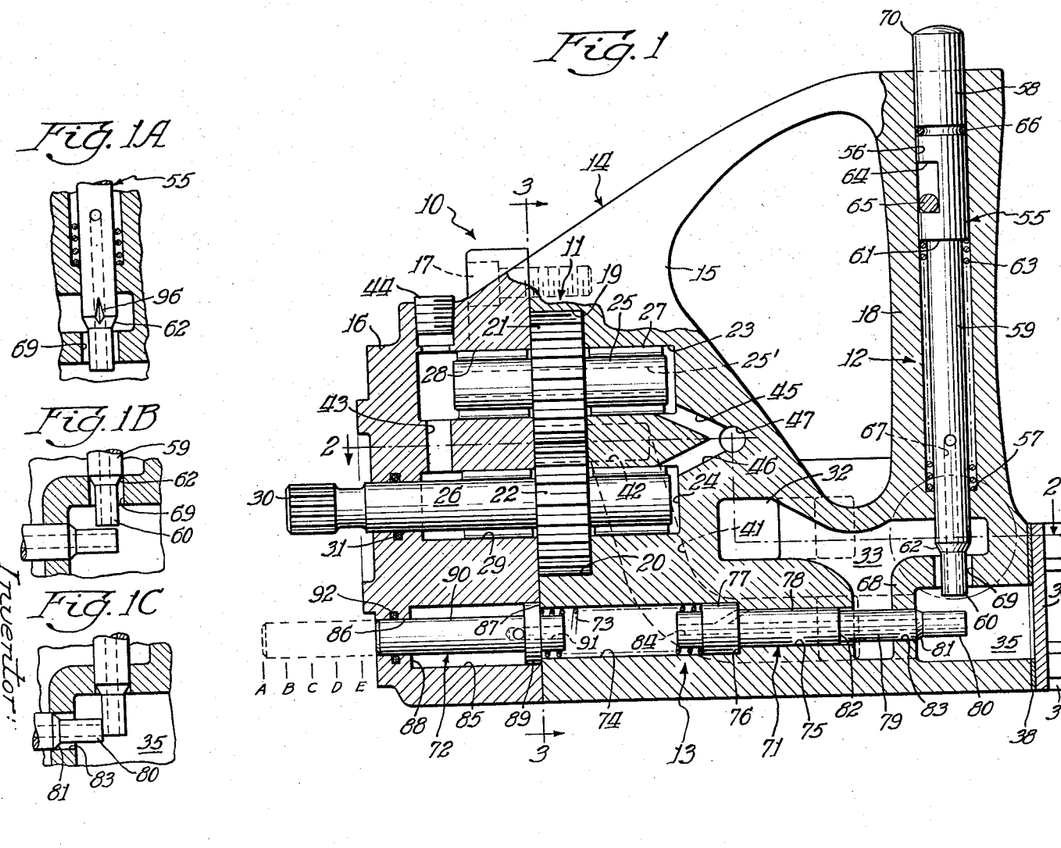
Figure 1 is a partial cross-sectional view of one embodiment of a fluid control unit constructed in accordance with my invention.
Figure 1A is an illustration of a modification of the portion circled in Figure 1.
Figure 1B is a partial view similar to Figure 1 illustrating the valve means in one position.
Figure 1C is a partial view similar to Figure 1 illustrating the valve means in another, interlocked, position.

The inlet chamber or cavity 33 and the outlet chamber or cavity 35 are separated by means of a wall 68 having a communicating opening 69 therein of a diameter substantially the same as the diameter of the stem portion 59 of the stem member 55. The lower end of the stem member 55 passes through the opening 69, so that when the tool is inoperative and/or when the stem member is in its position as shown in Figure 1, the smaller diameter portion 60 of the stem member 55 passes through the opening 69 and the conical-shaped surface juncture 62 is within the cavity 33 and spaced from the opening 69. Therefore, when these conditions exist, a communication exists between the inlet chamber or cavity 33 and the outlet chamber or cavity 35, so that pressure fluid will be relieved from the chamber 33 and will not flow to the fluid motor 11. By depressing the stem member 55, as by pressing on its terminal end 70, which extends to the outside of the hand grip portion 18, the opening 69 will be throttled and fluid will then be supplied to the fluid motor 11. The starting and stopping of the motor 11 and the amount of fluid supplied to the motor 11 may thus be controlled by the particular position of the stem member 55.

The fluid pressure control valve means 13 is disposed in the same plane and at right angles to the on-off-flow control valve means 12, and comprises a first stem member 71, a second stem member 72, and a coil spring 73 therebetween. The stem member 71 is received in concentric bores 74 and 75 of different diameters formed in the body member 15. A shoulder 76 is formed at the juncture of the bores 74 and 75, so as to limit the movement, in one direction, of the stem member 71. The stem member 71 comprises a first portion 77 of a diameter substantially the same as the diameter of the bore 74 and, which in its inoperative position as illustrated in Figure 1, abuts against the shoulder 76, a second portion 78 of a diameter less than the diameter of the portion 77, but substantially the same diameter as the diameter of the bore 75, a third portion 79 of a slightly smaller diameter than the diameter of the portion 78, and a fourth portion 80 of a still smaller diameter. A conical surface 81 joins the portions 79 and 80, and a pressure receiving annular surface 82 joins the portions 78 and 79. The stem portion 79 extends through an opening 83 in the wall 68 separating the chambers or cavities 33 and 35, and passes through the inlet chamber or cavity 33, as illustrated. The opening 83 is substantially of the same diameter as the stem portion 79. The smallest diameter portion of the stem 71 extends into the outlet chamber or cavity 35, as illustrated. The stem member 71 is bored, as at 84, to provide for relief of fluid in the cavity between the stems 71 and 72 in the bore 74, thus preventing a fluid-lock which would prevent the stem 71 from moving.

The stem member 72 is received in a pair of concentric bores 85 and 86 of different diameters formed in the cover member 16, the bore 85 being of a larger diameter than the bores 86 and 74, so that shoulders 87 and 88 are formed at their respective junctures. The stem member comprises a land portion 89 of substantially the same diameter as the diameter of the bore 85 and a shank portion 90 of substantially the same diameter as the diameter of the bore 86, the shank portion extending through the bore 86 to the outside of the housing member 16. The extent of movement of the stem member 72 is limited by the shoulders 87 and 88. The stem member 72 is bored, as at 91, to allow for relief of fluid which is in the bore 85, thus preventing a fluid-lock which would prevent the stem 72 from moving and a suitable O-ring seal 92 is provided in a groove formed in the cover portion 16 surrounding the shank portion 90 to prevent fluid leakage therearound. The value of the spring 73 and the position of the stem member 72 determine the maximum fluid pressure to be supplied to the fluid motor 11 at any particular time. As will be later explained, each of the tool attachments adapted to be connected to the fluid power unit 10 is provided with means to cooperate with the stem member 72 to limit its movement, some of the positions of the member 72 being shown in dotted lines in Figure 1 and identified as A, B, C, D and E. The pressure supplied to the motor 11 increases in progression from A to E.

With a particular setting of the member 72 and the on-off-flow control valve 12 in its illusrated position, fluid under pressure supplied to the inlet chamber or cavity 33 through the inlet passage 32, will pass through the opening 69 to discharge or outlet. When the valve stem 55 is depressed by pressure applied to its terminal end 70, the opening 69 will be progressively closed by means of the conical surface 62, thus allowing a flow of fluid to the motor 11 through the passage 39 to the motor inlet chamber 40. The fluid under pressure in the inlet chamber or cavity 33 acts on the pressure receiving annular surface 82 and tends to move the stem member 71 to the left, as illustrated in Figure 1. Such movement of the member 71 is resiliently opposed by the spring 73, but when the pressure becomes greater than desired, as determined by the position of the stem member 72 and the value of the spring 73, the pressure will cause an overbalance and the member 71 will move to the left, resulting in the unblocking of the opening 83 by the stem portion 79, so that fluid may be discharged through the opening 83 into the outlet chamber or cavity 35 with a reduction of fluid pressure.

Assuming that a particular tool attachment is connected to the power unit 10 and the tool is in operation, the valve stem 55 will be in a depressed position if the tool becomes snagged, so as not to operate or reciprocate, a very rapid pressure build-up will occur, and the fluid will act upon the pressure receiving annular surface 82, thereby rapidly moving the stem member 71 to its left, as viewed in Figure 1. In such a case, the opening 83 will become unblocked and fluid will be discharged therethrough and into the outlet chamber 35 to discharge. However, the normal tendency of the operator of a tool, in such a situation, is to continue to press on the valve stem 55, so as to provide a greater quantity of fluid to restart the tool. The valve member 55 will then be at its lower-most position, and in such a position, the valve stem 71 will be unable to return to its normal operating position since its terminal end (disposed in the chamber 35) will engage the lower-most portion 60 of the stem 55. This interlocking of the valves 12 and 13 allows fluid to be continually discharged through the opening 83 into the outlet chamber or cavity 35, with a rapid reduction in quantity of fluid flowing to the motor 11 and a rapid drop in fluid pressure and prevents damage to the power unit 10 and tool attachment. This interlock is not relieved until pressure on 55 is removed to allow it to return to normal inoperative position. Then the motor can be restarted as before described.

Figure 1B and 1C illustrate the valve means 12 and 13 in two of their various positions, Figure 1C showing them in the interlock position.

Figures 2, 3, 4:
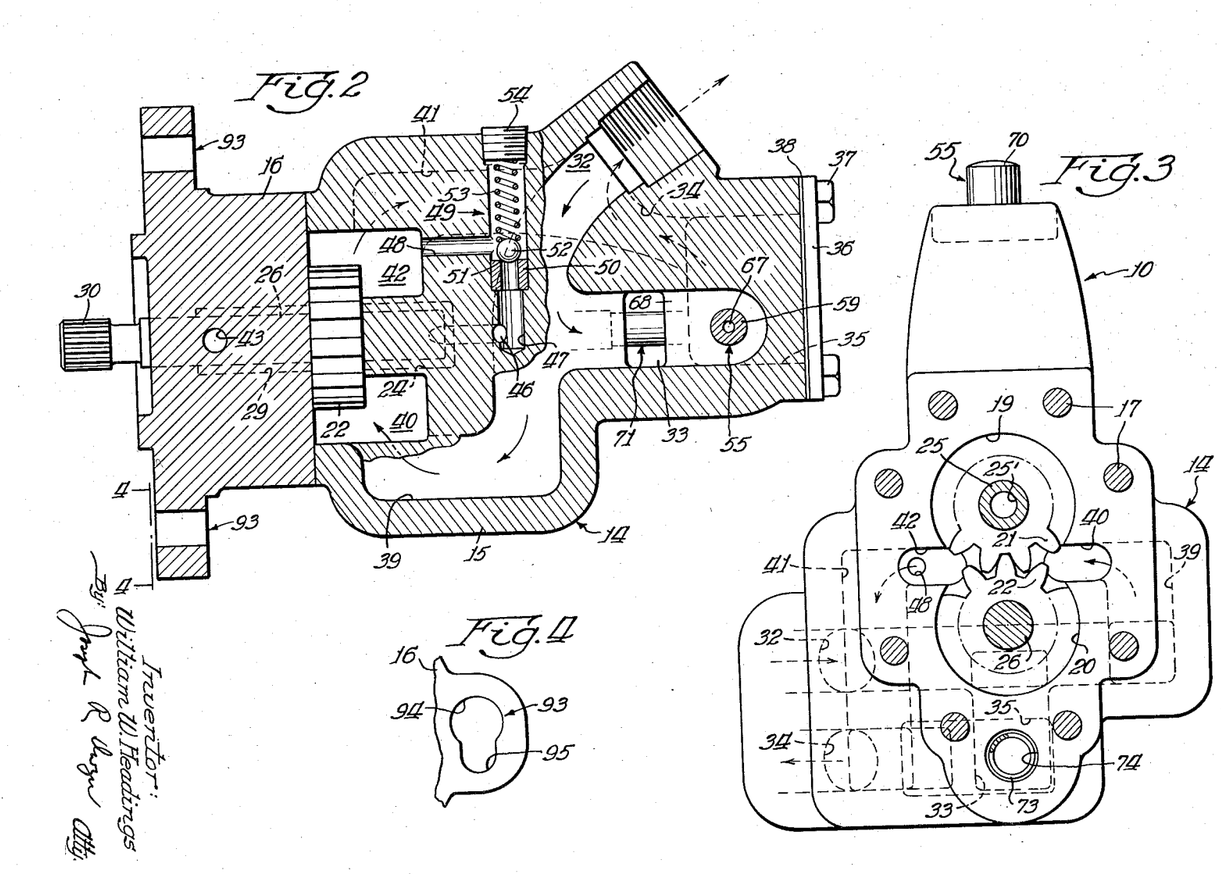
Figure 2 is a sectional view taken on line 2—2 of Figure 1 looking in the direction of the arrows.
Figure 3 is a view taken on line 3—3 of Figure 1 looking in the direction of the arrows.
Figure 4 is a partial illustration of the tool attachment mounting flange of the motor and control unit illustrated in Figures 1 to 3 and is taken on line 4—4 of Figure 2.

With particular reference to Figure 4, there is illustrated a flanged portion of the cover member 16 provided with an openinng 93 comprising a circular portion 94 and a slotted portion 95, by which tool attachments may be quickly connected to and disconnected from the power unit 10. Each of the tool attachments are supplied with a pair of oppositely disposed headed lugs, the heads of which are passed through the circular portion 94 and, upon slight rotation of the tool attachment, will be retained by the slotted portions 95. The opening 93 oppositely disposed from that illustrated is necessarily inverted for proper operation.

Reference is now directed to Figure 1A, wherein there is illustrated a modification of the on-off-fluid flow control valve means 12 of Figure 1, and which modification comprises a notch 96 formed in the stem member 55 and intersecting the conical surface 62. This notch effectively meters the flow of fluid through the opening 69 and results in a smoother operating power unit, since there is no abrupt starting of the motor, but one that is gradual.

Figures 5, 6:
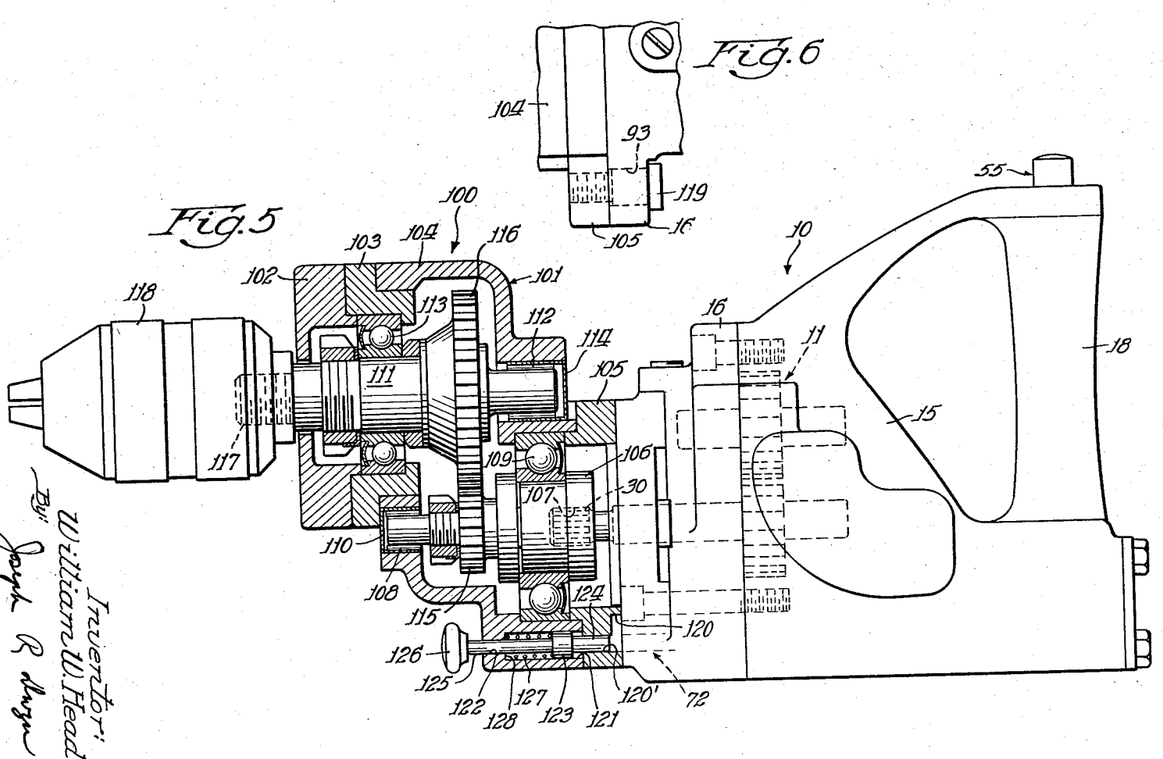
Figure 5 is an illustration of a drill attachment for the motor and control unit illustrated in Figures 1 to 4, with drill attachment shown in section and the motor and control unit having parts shown in section.
Figure 6 is a partial plan view showing the connection between the motor and control unit and the drill attachment of Figure 5.

Attention is now directed to Figure 5, wherein there is illustrated a drill attachment, generally indicated at 100, for connection to and disconnection from the fluid power and control unit 10 illustrated and described with references to Figures 1 to 4. The drill attachment broadly comprises a housing 101 constructed, for ease of manufacture, of a plurality of parts 102, 103, 104 and 105, the parts being retained in assembled relationship by means such as bolts, (not shown). The housing contains a shaft 106, internally splined at 107 for drivingly engaging the spline 30 extending from the unit 10, journalled in anti-friction bearings, such as needle bearings 108 and roller bearings 109, the bearings being retained in the housing part 104. The needle bearings 108 are disposed within a cup-like element 110, so that dirt and the like will be prevented from entering the housing 101. As is obvious, the shaft 106 is driven from the fluid motor 11 contained in the fluid power and control unit 10.

A countershaft 111 is disposed within the housing and forms a driving shaft for the drill. The shaft 111 is journalled in suitable bearings, such as needle bearings 112 and ball bearings 113, the bearings 112 being retained in the housing part 104 and the bearings 113 being retained by the housing parts 104 and 103. The needle bearings 112 are also disposed within a cup-like element 114 for the same reason as the bearings 108. Reduction gearing is provided within the housing and comprises a gear 115 splined to the shaft 106 and an intermeshing gear 116 splined to the shaft 111. Any thrust is taken by the bearing 113. The shaft 111 is screw-threaded, as at 117, at its terminal end extending from the housing for receiving a chuck 118, of any well-known type, which is adapted to fixedly retain a drill within its jaws. Instead of being screw-threaded, the shaft may have a tapered end for receiving complementary shaped chucks. The housing part 105 is flanged and provided with headed studs or bolts 119 (see Figure 6) adapted to be received in the openings 93 of the fluid power and control unit 10, so that the drill attachment may be easily connected to and disconnected from the power unit, as previously explained.

The housing part 105 is provided with a counter-bore 120 of a slightly larger diameter than that of the stem member 72 and into which the member 72 will extend when the drill attachment 100 and power and control unit 10 are properly connected and an opening 120' communicating with the counter-bore 120 but eccentric thereto. The housing part 104 is provided with a bore 121 and an opening 122 both of which communicate with the opening 120', and having different diameters, as illustrated. A piston element 123 is slidably disposed within the bore 121 and is provided with oppositely directed, axially extending, reduced portions 124 and 125, one of which, namely, 124, passes through the opening 120' for engagement with the stem member 72, and the other, namely, 125, passes through the opening 122 and is provided with a knob 126 exteriorly of the drill attachment housing. A coil spring 127 is provided surrounding the piston portion 125 and bears against the piston 123 and the end wall 128 of the bore 121. The spring 127 is a light one holding the piston member 123 against the member 72. The stem member 72 extends into the counter-bore 120, the depth of which controls the position of the stem member 72 and therefore the pressure requirement (as previously explained) for driving the drill attachment is determined. The knobbed piston is advantageously employed for pushing the stem member 72 inwardly and out of the counter-bore 120 for ease of disconnecting the drill attachment 100 from the power and control unit 10.

Figure 7:
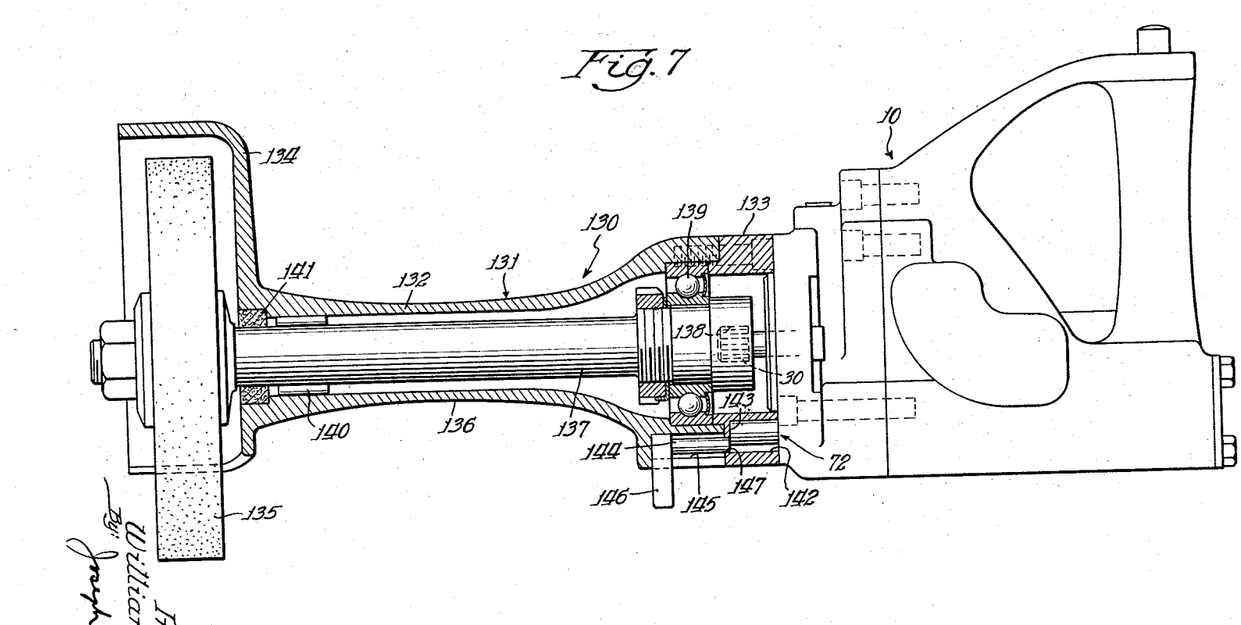
Figure 7 is an illustration of a grinder attachment for the motor and control unit illustrated in Figures 1 to 4 with the grinder attachment shown in section and the motor and control unit having parts shown in section.

Reference is now made to Figure 7 of the drawings, in which there is illustrated a grinder attachment, generally indicated at 130, for connection to and disconnection from the power unit 10 of Figures 1 to 4. Broadly, the grinder attachment 130 comprises a housing 131 constructed of parts 132 and 133, the part 132 providing a shield portion 134, for partially enclosing a grinding wheel 135, and a hand grip portion 136. The housing contains a shaft 137 internally splined at 138 for drivingly engaging the spline 30 of the unit 10. The shaft 137 is supported in ball bearings 139 and a plain bearing 140. A packing element 141 is provided, as illustrated, to prevent the ingress of dirt or the like into the housing 131. The terminal end of the shaft 137 is screw-threaded to receive the fittings, such as washers and nuts and the like, for attaching the grinding wheel 135 thereon in the usual manner.

The housing part 133 is bored at 142 for reception of the stem member 72 of the power and control unit 10, and the inner wall 143 of the bore 142 determines the position of the stem member 72, and thereby determines the fluid pressure at which the attachment operates. The grinder attachment 130 includes an ejector member or disengagement latch comprising a pin 144, received in a slotted bore 145 formed in the housing part 132, and provided with a depending member 146 normal thereto and extending to a position outside the housing 131. The pin 144 extends within an opening 147 in the wall 143 and is adapted to engage the stem member 72. Movement of the pin 144 allows the stem member 72 to be moved within the power unit 10, so that the attachment 130 may be easily disconnected from the power and control unit 10. The housing 131 of the grinder attachment is flanged and provided with headed studs or bolts adapted to be received in the openings 93 of the power and control unit 10, so that the grinder attachment may be easily connected to and disconnected from the power and control unit 10, in the same manner as described with reference to the drill attachment 100, illustrated and described with reference to Figures 5 and 6.

Figures 8, 9, 10:
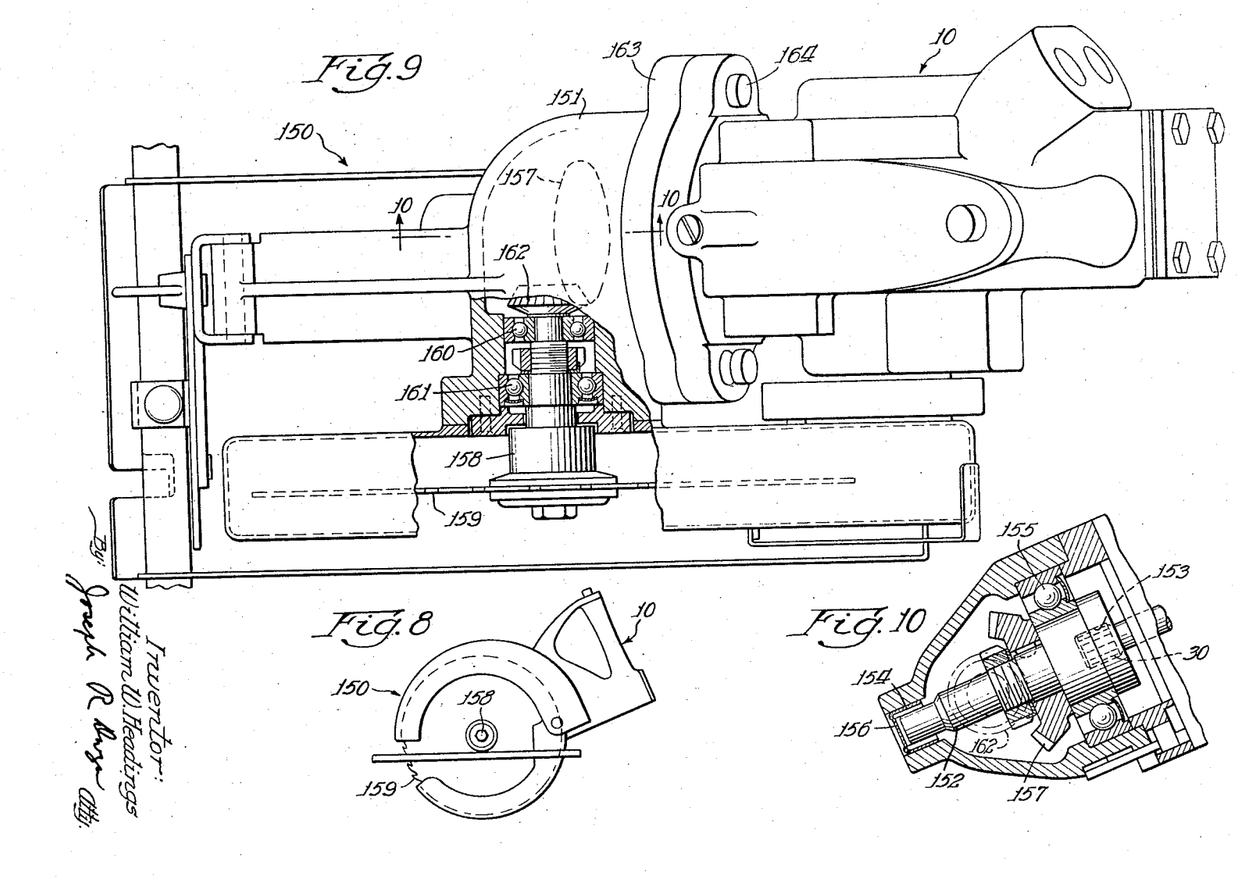
Figure 8 is an illustration, reduced in size, showing a hand saw incorporating the motor and control unit of this invention.
Figure 9 is a plan vier, partially in section and on a larger scale, of the hand saw of Figure 8.
Figure 10 is a cross-sectional view taken on line 10—10 of Figure 9 looking in the direction of thc arrows.

Attention is now directed to Figures 8, 9 and 10 wherein there is illustrated a hand saw attachment 150 for the fluid power and control unit 10 of Figures 1 to 4. Broadly, this attachment comprises a housing 151 in which a shaft 152 is splined at 153 for drivingly engaging the spline 30 of the power and control unit 10. The shaft 152 is supported in the housing 151 by means of anti-friction bearings 154 and 155. The bearing 154 is of the needle bearing variety and is disposed within a cup-like element 156, so as to prevent the entrance of dirt or the like within the housing, and the bearing 155 is of the ball bearing variety. The shaft 152 is provided with a bevel gear 157, retained thereon by means of the usual bearing nut, as illustrated.

The housing 151 is further provided with an angularly disposed portion in which a shaft 158 is located, to which shaft is attached, in the usual manner, a saw blade 159. The shaft 158 is normal to the shaft 152 and is journalled in appropriate ball bearings 160 and 161. The shaft 158 has keyed thereto a bevel gear 162 which meshes with the bevel gear 157. As illustrated, the gear 162 is smaller than the gear 157, so to provide an increased speed for the saw relative to the fluid motor 11. The attachment is further supplied with a guard, guide means, and the like, in the usual manner, but since such means do not form a part of this invention, further description is considered unnecessary.

The housing 151 is provided with a flanged portion 163 having headed studs or bolts 164 extending therefrom for cooperation with the slots 93 in the power and control unit 10, for connecting and disconnecting the attachment thereto, as previously explained with regard to the other tool attachments. Like the drill attachment and the grinder attachment, as illustrated in Figures 5 and 7, respectively, means is provided to determine the setting of the valve stem 72. Since with this attachment, high fluid pressures are required, the valve stem 72 enters the counter-bore 120 to thereby determine its setting, which corresponds to the highest fluid pressure value.

The embodiments of my invention thus described, have included a separate fluid power and control unit and various, separate, tool attachments therefor. However, my invention may take the form of complete tool units, each incorporating the combination of a fluid power and control portion and a particular tool portion. While the outward appearance of the power and control portion, to be described, may be slightly different, it incorporates the same elements, cooperating substantially in the same manner, as the separate unit 10 described with reference to Figures 1 to 4.

Figure 11:
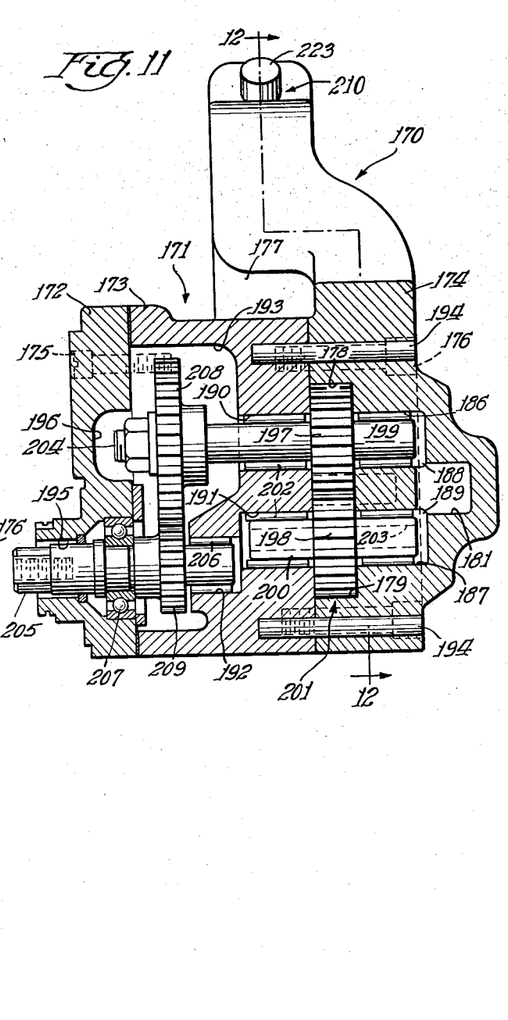
Figure 11 is a partial cross-sectional view of an alternative motor and control unit constructed according to this invention and especially adapted for attachment to a saw attachment similar to that illustrated in Figures 8 to 10.
Figure 12:
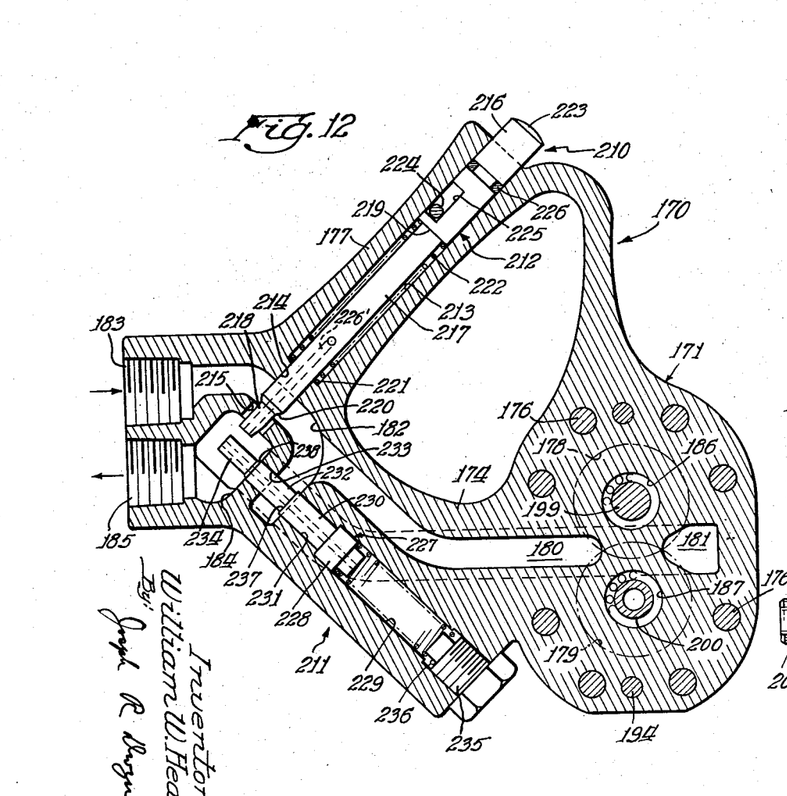
Figure 12 is a sectional view taken on line 12—12 of Figure 11 looking in the direction of the arrows.

I will now describe my invention with reference to Figures 11 and 12 which show a complete hand saw, generally indicated at 170 (the saw blade guard, and guide not being illustrated for sake of clarity). This embodiment comprises a housing indicated in its entirety at 171 comprising housing members 172, 173 and 174 suitably connected by means such as bolts 175 and 176. The housing member 174 is provided with a hand grip portion 177, and is bored to provide parallel, intersecting chambers 178 and 179 forming a motor chamber. The housing member 174 is formed with passages 180 and 181 leading to and from, respectively, the intersection of the chamber 178 and 179 for the flow of fluid thereto and therefrom, respectively. The passage 180 communicates with an inlet cavity 182, which, in turn communicates with an internally threaded inlet port 183 adapted to receive a suitable fitting on a fluid pressure line or hose from a source of fluid under pressure, the cavity 182 and port 183 being formed in the housing portion 174. The passage 181 communicates with a discharge chamber or cavity 184 which, in turn communicates with an internally threaded discharge port 185 adapted to receive a suitable fitting on a discharge line or hose to carry fluid to a sump or the like, the chamber or cavity 184 and the port 185 also being formed in the housing portion 174.

Also provided in the housing member 174 is a pair of bores 186 and 187 intersecting and concentric to, respectively, the chambers 178 and 179. The bores 186 and 187 communicate with the passage 181, as at 188 and 189, for a purpose to be described.

The housing member 173 is provided with bores 190 and 191 co-extensive with the bores 186 and 187, respectively, in the housing member 174. The housing member 173 is also provided with a bore 192, which bore communicates with the bore 191, and is formed with a cavity 193 therein. Suitable pins 194 retain the housing members 173 and 174 in proper alignment.

The housing element 204 forms a cover plate for the cavity 193 and is provided with an opening 195 having parts of different diameters and a recess 196.

A pair of intermeshing gears 197 and 198 having axially extending shafts 199 and 200 are received in the chambers 178 and 179, respectively. The shafts 199 and 200 are received in the bores 186, 190 and 187, 191, respectively. The intermeshing gears 197 and 198 comprise a fluid motor, generally indicated at 201, for providing a source of power for the tool, which in this case is a saw. The axially extending shafts 199 and 200 are journalled within suitable needle bearings 202 received in the bores 186, 187, 190 and 191, as illustrated. The shaft 200 is centrally bored at 203, and the shaft 199 extends within the cavity 193 and the recess 196 and is screw-threaded, as at 204, on its terminal end. Fluid under pressure is supplied to the motor 201 through the passage 180 and is discharged from the motor through the passage 181.

A shaft 205 extends through the opening 195 and within the bore 192, being journalled within the bore 192 by means of suitable needle bearings 206 and within the opening 195 in a suitable ball bearing 207. A packing member surrounds the shaft 205, as illustrated, to prevent the ingress of dirt or the like into the cavity 193. The shaft 205 is adapted to receive a suitable saw blade (not shown) on its terminal end, which is disposed outside the housing 171.

The cavity 193 serves as a gear box, having disposed therein a large diameter gear 208 splined, or otherwise connected, to the shaft 199, which gear meshes with a smaller diameter gear 209 splined, or otherwise connected, to the shaft 205. The relative sizes of the gears provide an increased speed relative to that of the motor 201 for driving the saw blade.

Fluid leaking past the shaft journals provides lubrication for the elements within the cavity 193 and will flow to the passage outlet 181 through the bore 203 in the shaft 200 and through the communications at 188 and 189.

As in the embodiment of Figures 1 to 4, means are provided for starting, stopping and regulating the flow of fluid to the motor 201, which comprises an on-off-flow control valve means, generally indicated at 210, and a fluid pressure control valve means, generally indicated at 211.

The on-off-flow control valve means 210 is like the valve means 12 of the Figures 1 to 4 embodiment and comprises a stem member 212 received in a bore 213 in the hand grip portion 177 of the housing member 174 which extends through a bore 214 of smaller diameter than the bore 213, through the inlet cavity or chamber 182, through an opening 215 formed in a wall separating the cavity 182 and the chamber 184, the opening being of equal diameter to the bore 214, and into the discharge chamber 184. The stem member 212 comprises a first portion 216 having a diameter substantially equal to the diameter of the bore 213, a second portion 217 having a diameter substantially equal to the diameter of the bore 214 and opening 215 and a third portion 218 of still smaller diameter. A shoulder 219 is formed at the juncture of the portions 216 and 217 and a conically-shaped surface 220 is formed at the juncture of the portions 217 and 218. A shoulder 221 is formed at the juncture of the bore 213 and the bore 214, and a coil spring 222 surrounds the stem portion 217 and is disposed between the shoulders 219 and 221 to resiliently urge the stem member 212 to the position shown in Figure 12.

Movement of the stem member 212 is accomplished by pressing the thumb on the top surface 223 thereof, and the extent of movement of the stem member 212 is limited by means of a pin 224 fixedly secured to the hand grip portion of the housing 177 and received in a slot 225 in the stem member 212. Suitable O-ring sealing means 226 is provided in a groove in the stem portion 216 to prevent the leakage of fluid therearound, and the stem member is bored at 226' to allow the discharge of any fluid within the bore 213 when the stem 212 is pressed downward.

By manipulating the stem member 212 the starting and stopping of the motor 201 is controlled and the amount of fluid supplied to the motor 201 is determined, since the opening 215 providing communication between the chambers 182 and 184 is progressively closed upon downward movement of the stem member 212, thereby progressively reducing a bypass of the fluid from inlet to discharge.

The pressure control valve means 211 is similar to the valve 13 described with reference to the Figures 1 to 4 embodiment and comprises a valve piston 227 having a first portion 228 received in a bore 229 in the housing member 174, a second portion 230 of a smaller diameter received in a bore 231 concentric to and intersecting the bore 229 and communicating with the chamber 182, a third portion 232 of a still smaller diameter passing through a portion of the inlet chamber or cavity 182 and an opening 233 in a wall between the chambers 182 and 184, and a fourth portion 234 of still smaller diameter extending into the outlet chamber 184. A plug member 235 is received in one end of the bore 229, and a coil spring 236 is disposed between the plug member 235 and the piston portion 228. The juncture of the portions 230 and 232 provides an annular pressure receiving surface 237, and the portions 232 and 234 are joined by means of a conically-shaped surface 238. The value of the spring 236 determines the maximum pressure to be supplied to the fluid motor 201, so that pressure in excess of this maximum will act on the annular pressure receiving surface 237 and cause the valve piston 227 to move against the force of the spring 236. Such movement will cause the opening 233 to be unblocked and provide communication between the chambers 182 and 184 to allow a discharge of fluid from inlet to discharge and thereby reduce the fluid pressure to the required, predetermined value.

As is obvious, this motor and control system for operating the tool is substantially the same as that described with reference to Figures 1 to 4, and the same interlock feature of the valves 211 and 212 for preventing the breakdown of the fluid motor upon snagging of the saw is provided. Therefore, such feature need not be further described. The pressure control valve means 211 is not provided with means to select a particular pressure as in the unit described with reference to Figures 1 to 4, since the power requirement of a unitary unit is substantially constant and such means is not necessary.

Figure 13:
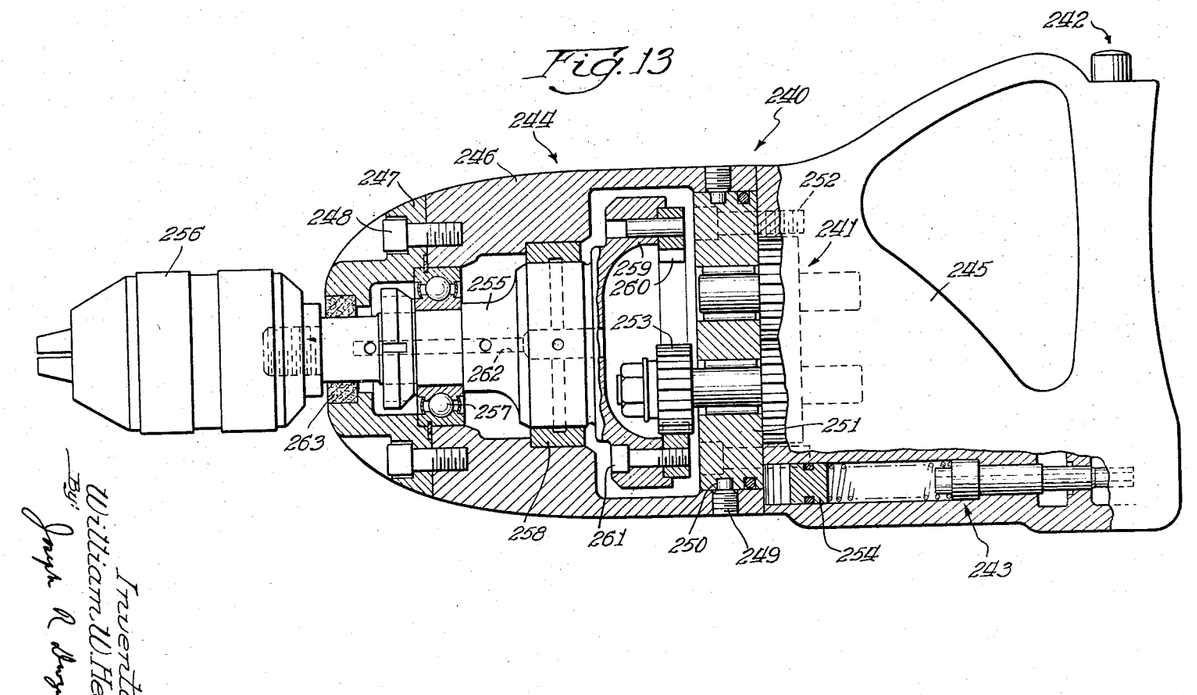
Figure 13 is a partial sectional view of a unitary motor and control unit and hand drill constructed in accordance with my invention.

Attention is now directed to Figure 13 illustrating a unitary hand drill generally indicated at 240 which incorporates a power and control unit of my invention. Broadly, this modification comprises a fluid motor, indicated at 241, an on-off-flow control valve means, indicated at 242, and a pressure control valve means, indicated at 243. The hand drill is contained within a housing, indicated in its entirety at 244 comprising a housing member 245 formed with a hand grip portion, and housing members 246 and 247. The housing members 246 and 247 are connected by means, such as bolts 248, and the housing members 246 and 245 are connected by means of pin elements 249 threadably received in the housing member 246 and extending into apertures 250 formed in a block 251 connected to the housing member 245 by means, such as bolts 252.

The fluid motor 241 is essentially the same as that described with reference to Figures 1 to 4, so that further description would be repetitious. For supplying power from the motor 241, one of its axially extending gear shafts is provided with a pinion 253, suitably attached thereto. The on-off-flow control valve means 242 is identical to the flow control valve means 12 described in detail with reference to Figures 1 to 4, and further description is unnecessary. The pressure control valve means 243 is essentially the same as that described in detail with reference to the means 13 of Figures 1 to 4, except for the plug member 254, which corresponds to the stem member 72 in the earlier embodiment. Since the pressure requirements of one particular tool is fixed, it is unnecessary to provide for adjustment of this valve, such adjustments being required when various different tool attachments are employed, as in the Figures 1 to 4 embodiment. Except for the provisions for adjustment in the earlier embodiment, the structure and operation of the valve means 243 is the same as that for the corresponding valve means 13 previously described, and further description is unnecessary.

The housing member 246 forms an enclosure for a motor driven shaft 255 upon which is secured a chuck 256 of any well-known type. The shaft 256 is journalled in bearing means 257 and 258 and is formed with an enlarged, flanged portion 259 for mounting a ring gear 260, the latter being attached to the flanged portion 259 by means, such as bolts 261, so that it may be easily replaced when necessary. The ring gear 260 meshes with the pinion 253 connected to motor gear shaft, as previously explained.

The shaft 255 is bored, as at 262, so that the bearings 257 and 258 will be provided with a lubricant, the lubricant being fluid which leaks past the gear shaft journals into the housing member 246.

The housing member 247 serves as a cover plate for the drill gearing, and is provided with a packing gland 263 surrounding the shaft 255 to prevent the leakage of fluid from the housing or the ingress of dirt or foreign material into the housing.

Attention is now directed to Figures 14 to 21 wherein there is illustrated another embodiment of a power and control unit, constructed according to my invention, which, in addition to the on-off-flow control and fluid pressure valves of the embodiments previously described, includes a directional control valve for changing the direction of rotation of the fluid motor and a speed control valve which limits the flow of the fluid supplied to the power and control unit.

Figures 14, 15:
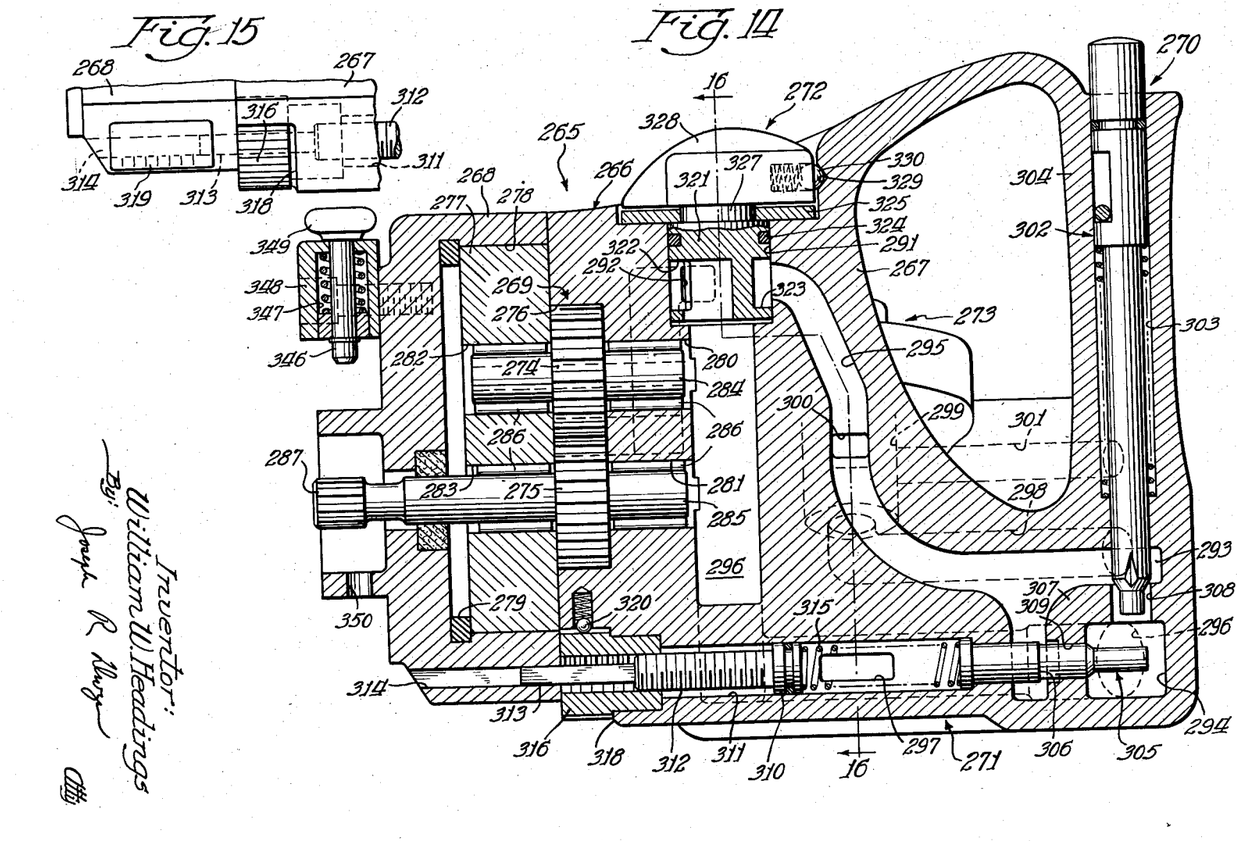
Figure 14 is a sectional view taken on line 14—14 of Figure 16 and illustrates another embodiment of a power and control unit constructed according to my invention which includes, in addition to the on-off-flow control valve and the fluid pressure control valve of the Figures 1 to 4 embodiment, a directional valve and a speed control valve.
Figure 15 is a partial elevational view taken on line 15—15 of Figure 16 and illustrates the pressure selecting means associated with the fluid pressure control valve of the embodiment illustrated in Figure 14.

With particular reference to Figure 14, there is illustrated a power and control unit, indicated in its entirety at 265, comprising a housing, generally indicated at 266 which includes a body member 267 and a cover member 268 suitably joined by means such as bolts (not shown). The power and control unit 265 includes a fluid motor 269, an on-off-flow control valve 270, a fluid pressure valve 271, a directional control valve 272, and a speed control valve 273.

The fluid motor 269 comprises a pair of intermeshing gears 274 and 275 disposed within a motor chamber 276 formed of a pair of parallel intersecting bores in the body member 267. A plate member 277 forms one wall of the chamber 276 and is held to the body member 267 by bolts (not shown) and dowels (not shown) to assure alignment. The bore 278 aligns the housing 265 which is held to member 267 by bolts (not shown). A gasket 279 seals the chamber between members 277 and 268. The body member 267 is provided with bores 280 and 281 and the plate member 277 is provided with bores 282 and 283, the bores 280 and 282, 281 and 283 receiving axially extending shafts 284 and 285, respectively, of the gears 274 and 275. The shafts 284 and 285 are suitably journalled in needle bearings 286, as illustrated. The terminal end of the shaft 285 extends to a position outside the housing 265 and is provided with a splined portion 287 for connection with a tool attachment, so as to provide a driving means, therefor. Chambers or cavities 288 and 289 (see Figures 16 and 18), respectively, communicate with the cavity 276, and function as motor inlet and outlet chambers depending upon the position of the directional control valve 272, to be described. A passage 290 connects the chamber 288 and a bore 291, and a passage 292 connects the chamber 289 and the bore 291, the passages 290 and 292 and the bore 291 being formed in the body member 267. The directional control valve 272, to be described is disposed in the bore 291.

The body member 267 is provided with an inlet cavity 293 and an outlet cavity 294 (see Figure 14), the inlet cavity 293 being connected to the cavity 291, in which the directional control valve 272 is disposed, by means of a passage 295, and the outlet cavity 294 being connected to the cavity 291 by means of a passage 296. A passage 297 connects the outlet cavity 294 with the cavity between 310 and 305 in the bore 311 to eliminate fluid-lock and allow 305 to move. The housing 266 is provided with an inlet passage 298 (see Figures 14 and 16) which communicates with a bore 299 in which is disposed the speed control valve means 273, later to be described, which bore 299 is connected to the passage 295 by means of a short passage 300. Also, the housing 266 is provided with a passage 301 (see Figure 14) which also communicates with the bore 299 in which the speed control valve 273 is disposed, which passage will be referred to as a pilot passage. The passages 296, 298 and 301 are screwthreaded (not shown) at their terminal ends for the attachment of suitable hoses thereto.

The on-off-flow control valve 270 comprises a piston member 302 disposed within a bore 303 in a hand grip portion 304 of the body member 267. The flow control valve means 270 is the same as that shown in Figure 1 of the drawings and described with reference thereto and incorporates the modification illustrated and described with reference to Figure 1A. This being the case, further description at this time would be repetitious and is considered unnecessary.

The fluid pressure valve means 271 comprises a piston member, indicated in its entirety at 305, provided with an annular pressure receiving surface 306. This piston member 305 of the fluid pressure valve means 271 is substantially the same as the corresponding part of the fluid pressure valve means 13 described with reference to Figure 1, and further description thereof would be repetitious and is considered unnecessary.

Like the embodiment of Figure 1, the inlet and outlet cavities 293 and 294, respectively, are separated by a common wall 307 having openings 308 and 309 through which portions of the piston members 302 and 305, respectively, pass. The flow control valve means 270 and the fluid pressure valve means 271, like the corresponding valves of the Figure 1 embodiment, cooperate with one another to provide an interlock when snagging of the tool attachment occurs, so as to prevent damage to the fluid motor 269.

There is also provided in the instant embodiment means to select a particular pressure to be supplied to the fluid motor. The means to accomplish this function is slightly different from that shown and described with reference to Figure 1 and here comprises a plug member 310 slidable within a bore 311 formed in the housing member 266 and in which a portion of the piston member 305 is disposed. The plug member 310 has integrally formed therewith an axially extending, externally screw-threaded portion 312 and an axially extending square portion 313, the latter being received in a square broach 314 of like dimensions formed in the cover member 268. A coil spring 315 is disposed within the bore 311 between the plug member 310 and the piston 305 of the fluid pressure valve means 271, and an internally threaded knurled nut 316 is received within the body member 267, the threads thereon engaging the threaded portion 312, as illustrated. The knurled portion of the nut 316 is exposed for access by providing a cut-away portion 318 of the body member 267. Upon turning the nut 316, the plug 310 may be moved, between limits, within the bore 311, rotation of the plug 310 being prevented by the square portion 313. Movement of the plug 310 will either increase the loading of the spring 315 or decrease the loading of the spring 315, and thereby determine the particular pressure required to be applied to the annular pressure receiving surface 306 of the piston 305 to move the piston 305 within the bore 311. As previously explained with reference to the Figure 1 embodiment, when the piston of the fluid pressure valve means, here the piston 305, is moved to the left, as illustrated in the drawings, the inlet cavity 293 will be placed in communication with the outlet cavity 294 by means of the opening 309, this occurring when the pressure of the fluid in the inlet cavity 293 is above a predetermined value as determined by the setting of the plug 310. An index member 319 is attached to the cover member 268, so that by looking at the terminal end of the square portion 313 the particular predetermined fluid pressure setting of the valve means 271 may be determined. A spring pressed detent ball 320 is provided to retain the nut 316 in any particular setting.

Figures 17, 18, 19, 20:
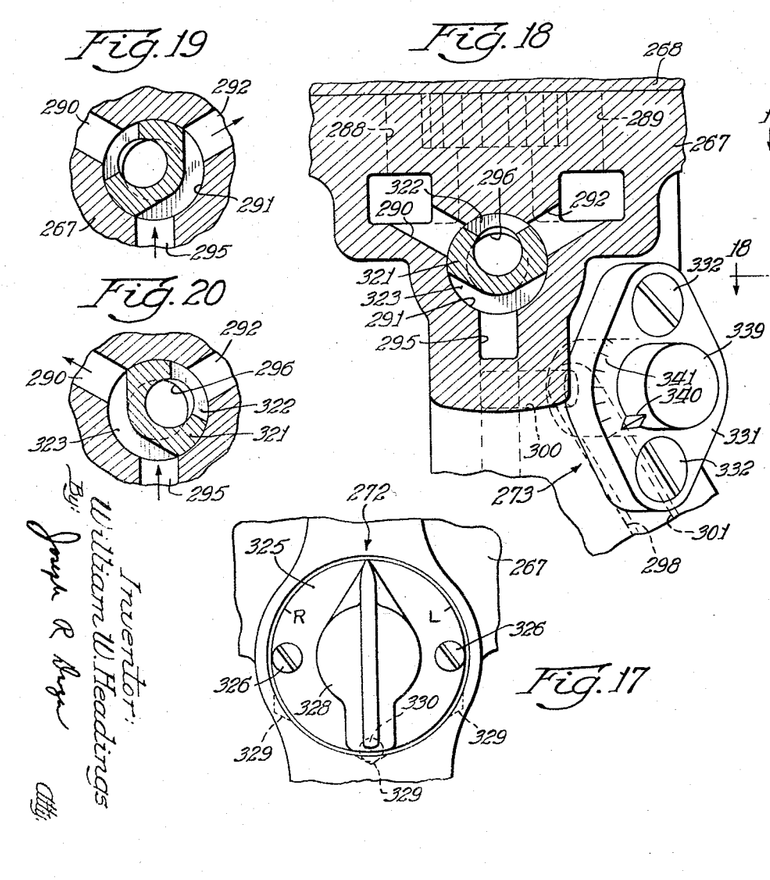
Figure 17 is a partial plan view taken on line 17—17 of Figure 16.
Figure 18 is a partial sectional view taken on line 18—18 of Figure 16 and illustrates to advantage the directional valve of the embodiment of Figure 14, when the directional valve is in its neutral position.
Figure 19 is a partial sectional view similar to the view of Figure 18 and illustrates the directional valve in another position.
Figure 20 is a partial sectional view similar to Figure 19 illustrating the directional valve in still another position.

The directional control valve 272 comprises a cylindrical valve member 321 received in the bore 291, which bore is concentric to and intersects the passage 296, as illustrated. The valve member 321 is formed with an angularly arranged passage 322, which intersects the periphery and bottom thereof and provides a communication between either the passage 290 or 292 and the passage 296, depending upon whether the valve member 321 is positioned for clockwise or counter-clockwise rotation of the shaft 285. When the directional valve is in its neutral position a slight communication is provided between the three passages. The valve member 321 is formed with a recess 323 which extends around a substantial portion of its periphery member so as to provide a communication between the passage 295 and one or the other of the passages 290 and 292, or where it may block all communication between the passages 290, 292 and 295 depending upon the position of the valve means 323, as illustrated in Figures 18, 19 and 20. A suitable O-ring seal means 324 is provided around the periphery of the valve member 321 to insure a fluid tight seal with the bore 291, and the valve member 321 is retained in its proper position by means of a plate element 325 secured to the body member 267 by means of machine screws 326. The plate element 325 has a central opening therein through which a stem portion 327 of the valve member 321 extends and engages a shoulder formed at the juncture of the stem portion 327 and the valve member 321. The plate element is provided with suitable indicia to indicate the direction of rotation of the shaft 285 forming the drive shaft for the motor. A knob member 328 having a pointer portion secured to the stem portion 327 for easily changing the position of the valve member 321 and thereby the direction of rotation of the shaft 285. The body member 267 is provided with a plurality of detents 329 corresponding to the various positions of the valve member 321 and a spring pressed detent ball 330 is disposed within the knob member 328 so as to engage the corresponding detent 329.

The speed control valve means 273 (see Figure 16) comprises a flanged body member 331, attached by machine screws 332 to the body member 267, and provided with a cylindrical depending sleeve portion 333 disposed within the bore 299. A suitable O-ring sealing means 334 is provided in a groove in the body portion 267 and contacts the juncture of the flange member 331 and its depending portion 333, as illustrated, so as to provide a fluid tight seal. The flanged body member 331 is provided with concentric bores 335 and 336, the bore 335 being of a larger diameter than the bore 336. A cylindrical valve member 337 is rotatably disposed within the bore 335 and is provided with a reduced diameter stem portion 338 extending within and beyond bore 336. A knob member 339 is attached to the outwardly extending stem portion 338 of the valve member 337 and is provided with a pointer means 340 to indicate the speed of the fluid motor by means of cooperating indicia 341 suitably marked on the flanged body member 331.

Figure 16:
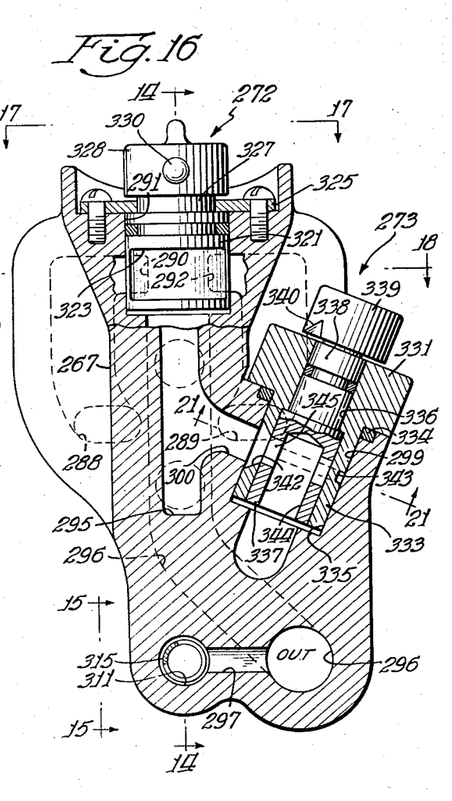
Figure 16 is a sectional view taken on line 16—16 of Figure 14 illustrating the additional valve means of Figure 14.
Figure 21:
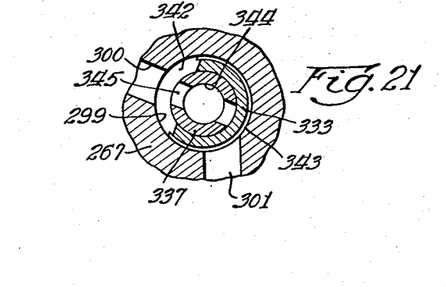
Figure 21 is a partial sectional view taken on line 21—21 of Figure 16 and illustrates to advantage the speed control valve of the Figure 14 embodiment.
Figure 22:
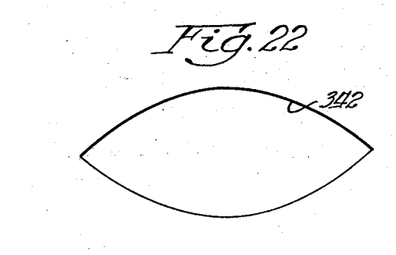
Figure 22 is an illustration of the development of the variable orifice associated with the speed control valve illustrated in Figure 21.

The sleeve portion 333 of the member 331 is provided with an opening 342 extending over a substantial portion of its periphery and which is disposed adjacent the passage 300, as clearly shown in Figures 16 and 21. The shape of the opening 342 is illustrated in Figure 22. The sleeve portion 333 is also provided with an annular groove 343 which intersects the opening 332 at its opposite ends and is in communication with the passage 301.

The valve member 337 is provided with an internal bore 344 and an opening 345 intersecting the bore 344 and disposed in the same plane as the opening 342 in the sleeve portion 333. The bore 345 is in communication with the inlet passage 298, and the opening 345, in some of its positions, is in communication with the opening 342 and the passage 300. As may be readily seen, by rotating the knob 339 the position of the valve member 337 will be changed and upon rotation, the effective size of the opening 345, cooperating with the opening 342, providing communication between the passages 298 and 300 will be effectively varied. By varying the size of the opening, the fluid pressure drop across the opening is varied and this pressure difference is reflected to an external flow control valve (later to be described) which in turn varies the fluid flow from the source and, therefore the speed of rotation of the motor 269 and the tool attachment may be controlled within close limits. It may be also readily seen that when there is a flow of fluid from the passage 298 to the passage 300, there will also be a flow of fluid in the groove 343 and through the passage 301, which as previously stated is a pilot line connected to a flow control valve in the source of fluid pressure, later to be described.

For ease of connection and disconnection of a tool unit to the power and control unit then described, there is provided a spring pressed detent pin 346 extending from a cylindrical cavity 347 in member 348 suitably attached to the cover portion 268. A knob 349 is provided to move the pin upward, so that a tool attachment may be connected to or disconnected from the unit 265. The pin 346 fits into a corresponding opening in the tool attachment upon release of the knob, so as to retain the attachment and unit 265 connected. Also an angularly arranged, slotted opening 350 is provided to receive a pin on a tool attachment, as will be described.

Figure 23:
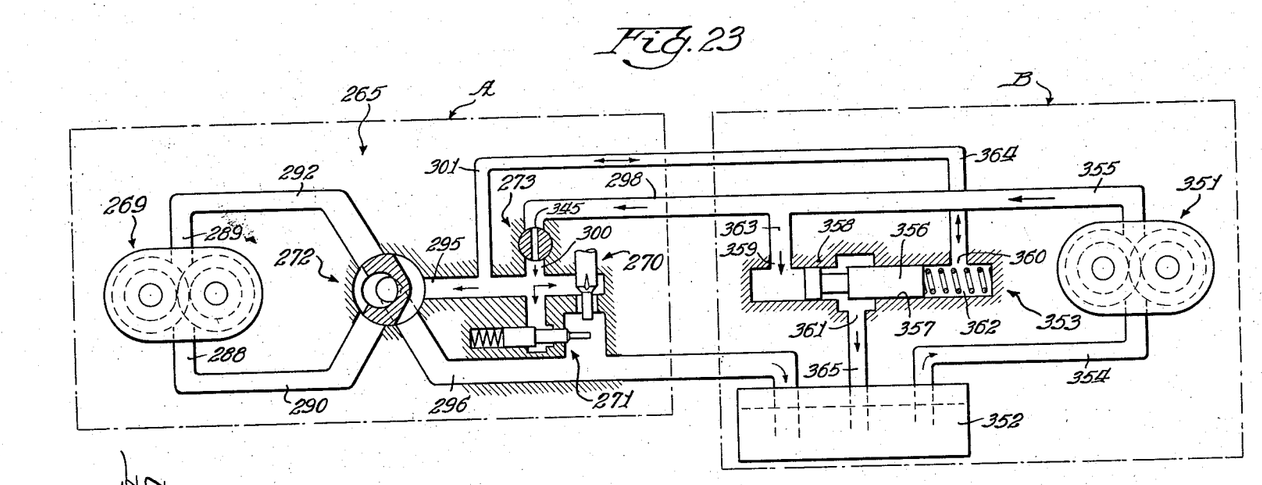
Figure 23 is a diagrammatic showing of a hydraulic system especially adapted for use with the power and control unit of the Figure 14.

Attention is now directed to Figure 23 wherein there is illustrated diagrammatically the power and control unit shown in Figures 14 to 22 identified in its entirety with the letter A, and a source of fluid pressure identified in its entirety with the letter B.

The various valves, parts and passages shown diagrammatically in part A of Figure 23 are identified with the same reference characters employed to designate the same parts in Figures 14 to 22. The portion B comprising a source of fluid pressure includes a pump 351, a sump 352, and a constant flow control valve indicated at 353. The part B forms no part of the instant invention, but will be described in order to fully explain the operation of the power and control unit 265.

A conduit 354 connects the sump 352 and the inlet of the pump 351, and a conduit 355 connects the outlet of the pump 351 with the inlet passage 298 of the power and control unit 265, as illustrated. The pump 351 may be of the intermeshing gear type or any other suitable type of well-known construction.

The constant flow control valve 353 comprises a piston 356 slidably disposed within a bore 357 in a casing portion 358. The casing portion 358 is provided with ports 359, 360 and 361. A coil spring 362 is disposed between the piston 356 and the right end of the cavity 357, as illustrated. The port 359 is connected to a branch conduit 363 of the conduit 355 leading from the pump outlet chamber to the inlet passage 298 of the power and control unit 265; the port 360 is connected to a conduit 364 which in turn is connected to the passage or pilot line 301; and the port 361 is vented to the sump 352 by means of a conduit 365.

The speed control valve means 273 together with the flow control valve 353 assure the motor 269 of being driven at a selected rate of speed irrespective of variations in the loading within the capacity range of the motor. The pump 351 is a constantly rotating one, so as to provide a constant flow of fluid under pressure to the system.

The positioning of the speed control valve 273 selects the speed of the motor, so that by varying the orifice therein, a lower speed results. This orifice 345 is effective to produce a pressure drop between the inlet 298 and the outlet 300 which is taken advantage of to automatically control the operation of the motor 269 to predetermine the rate of rotation thereof irrespective of variations in the loading of the motor reflected by the particular tool attachment being used. The flow control valve 353 is effective to perform this important function.

The valve 353, as may be seen, incorporates a reciprocable body, a plunger or piston 356 which has its terminal ends subjected to fluid pressures, the right hand end being subjected to fluid pressure from the conduit 364 and the left hand end being subjected to the pressure from the conduit 363, and depending upon the position of the piston 356, there may or may not be a communication between the right hand end or the left hand end and the conduit 365 leading to the sump 352.

Variations in the liquid pressure delivered from the variable orifice speed control valve 273 (and into the conduit 301) will be reflected to and act upon the right hand end of the piston 356. The inlet pressure from the pump 351, which remains substantially constant, acts on the left hand end of the piston 356. When, for example, the motor 269 tends to speed up or increase its rate of rotation, this is evidenced by a drop in the pressure acting on the right hand end of the piston 356 with the result that the pressure acting on the left hand end of the piston 356 becomes effective to move the piston to the right and provide a communication between the ports 359 and 361. This has the effect of reducing the volume of pressure fluid delivered to the motor 269 and hence reduces the speed thereof, as the latter is directly proportional to the displacement of fluid passing therethrough.

Alternatively, if the loading on the motor 269 is increased appreciably, then the motor 269 will have a tendency to slow down causing a building-up of the pressure on the right end of the piston 356 and hence the delivery of an increased proportion of or the entire output of the pump 351 to the motor to thus cause the same to maintain its speed notwithstanding the increased work that it is called upon to do.

Figure 24:
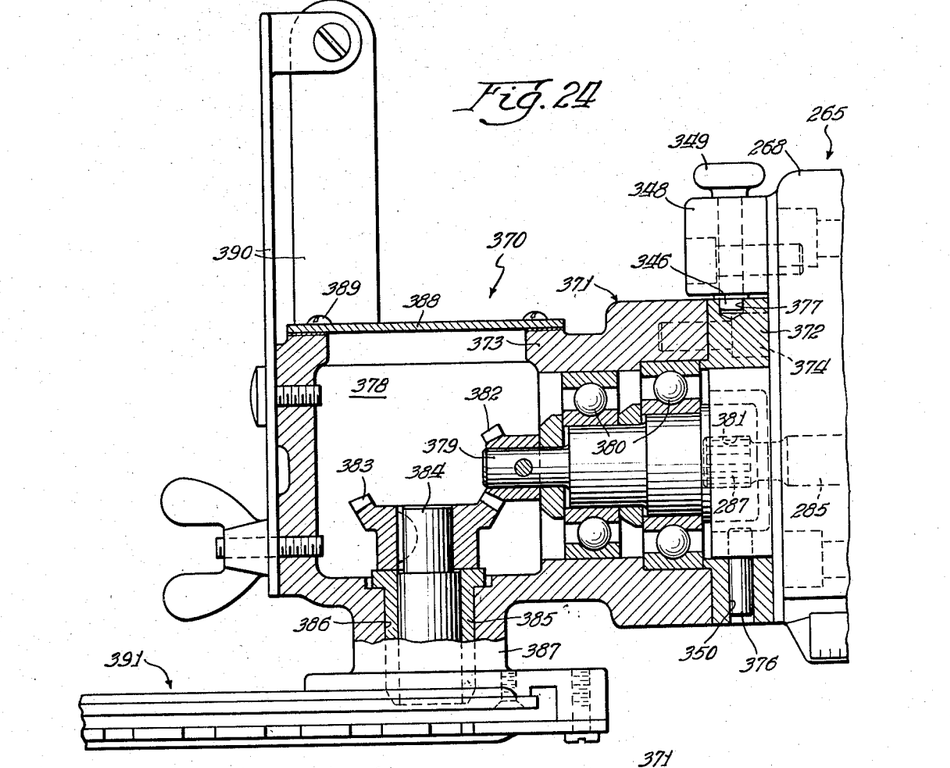
Figure 24 is a partial sectional view of a hedge shear or trimmer attachment especially adapted for connection to and disconnection from the power and control unit illustrated in Figures 1 and 14.
Figure 25:
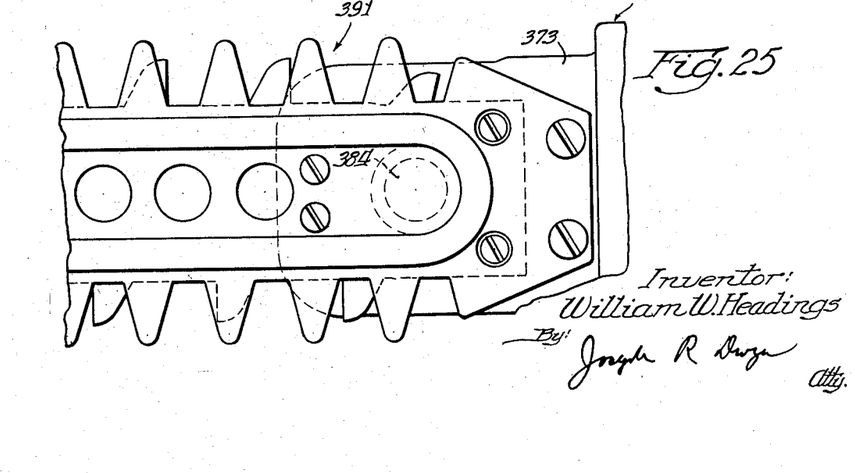
Figure 25 is a partial view of the hedge shear or trimmer attachment of Figure 24 looking up from the bottom of Figure 24.

Attention is now directed to Figures 24 and 25 showing a hedge shear attachment for the power and control unit of Figures 14 to 22 inclusive. It is understood that by slightly modifying the attachment housing means, to be described, such an attachment may be used with the power and control unit described with reference to the Figures 1 to 4.

The hedge shear attachment is indicated in its entirety at 370, and comprises a housing, generally indicated at 371, comprising a first member 372 and a second member 373 suitably connected by means such as bolts 374. The housing member 372 is essentially a ring-like member provided with an internal cavity adapted to fit over a corresponding part of the cover member 268 of the control unit 265, and have attached thereto a pin member 376 adapted to fit into the opening 350 in the cover member 268. The pin 376 is inserted into the opening 350 and the attachment is rotated, so as to engage the pin with the end of the angular portion of the opening 350, so as to be fixed in its position illustrated. There is also provided a detent 377 into which the spring pressed pin member 346 attached to the cover member 268 is adapted to fit. This insures a fast connection between the tool unit and the power and control unit, as will be readily understood. The housing member 373 is provided with an opened sided chamber 378 to receive a shaft 379 journalled in suitable ball bearing journals 380, and the shaft 379 is internally splined at 381 for engagement with the splined portion 287 of the shaft 285. A bevel gear 382 of a relatively small diameter is fixably attached to the shaft 379 and meshes with a bevel gear 383 of a larger diameter keyed or otherwise suitably attached to a shaft 384 journalled in a plain bearing 385 disposed within a bore 386 in a downwardly extending portion 387 of the housing member 373. A cover plate 388 forms a wall of the chamber 378 and is affixed to the housing member 373 by means of machine screws 389. Suitable, adjustable, hand grip means 390 are removably attached to the housing member 373, as illustrated. A trimmer attachment, indicated in its entirety at 391, is attached to the depending portion 387 of the housing 371 in a suitable manner, such as by machine screws or bolts. The trimmer attachment 391 is of well-known construction and forms no part of the instant invention and further description is deemed unnecessary.

It is to be understood that the hedge shear attachment may be constructed for attachment to the power and control unit 10 of Figures 1 to 4, and also, that the various tool attachments described with reference to the power and control unit 10 may be constructed for use with the latter described power and control unit. Also, other attachments, such as a speed-nut wrench, requiring a rotatably driven power unit, may be used with the power and control units herein described.

While I have described my invention in connection with certain specific embodiments thereof, it is to be understood that this is by way of illustration and not by way of limitation and the scope of my invention is

I claim:

1. In a valving arrangement for a power means having a pressure fluid driven motor for driving a tool where the driven tool is subject to conditions causing seizure of said motor, the improvement comprising: means defining a supply passage for conveying pressure fluid to said motor; means defining an exhaust passage; means defining a first passage interconnecting said supply passage with said exhaust passage; means defining a second passage interconnecting said supply passage with said exhaust passage intermediate said first passage and said motor; a selectively operable control valve adapted to progressively and infinitely control the interconnection between said supply passage and said first passage, said control valve when in a fully opened position permitting a bypassage flow of fluid from said supply passage to said exhaust passage whereby said motor is inoperative and when in a fully closed position preventing said bypassage flow whereby said motor receives a maximum flow of pressure fluid; a relief valve adapted to control the interconnection between said supply passage and said second passage and resiliently urged to a position preventing flow from said supply passage to said second passage; means defining a pressure receiving surface on said relief valve, said surface being subject to the force of said pressure fluid in said supply passage whereby said relief valve is moved to a different position when the value of said pressure fluid in said supply passage exceeds a predetermined value and causes a bypassage flow of pressure fluid from said supply passage to said exhaust passage to thereby control the pressure value of the pressure fluid conveyed to said motor, said control valve adapted to retain said relief valve in said different position when said motor is seized to prevent a build-up in the pressure value of the pressure fluid delivered to said motor.

2. In a valving arrangement for a power means having a pressure fluid driven motor for driving a tool where the driven tool is subject to conditions causing seizure of said motor, the improvement comprising: means defining a supply passage for conveying pressure fluid to said motor, a pair of valves, one of said valves controlling the quantity of pressure fluid conveyed to said motor for thereby starting and stopping said motor and the other controlling the pressure value of said pressure fluid conveyed to said motor, said other valve normally being maintained in a position permitting a build-up in pressure value in said pressure fluid in said supply passage to a value below a predetermined value and, when said pressure fluid in said supply passage exceeds said predetermined pressure value, said other valve being movable to a different position to prevent a build-up in pressure value, said one valve being adapted to retain said other valve in said different position when said motor is seized to prevent a build-up in the pressure value of the pressure fluid conveyed to said motor.

3. In a power tool, the combination of a pressure fluid driven motor subject to seizure during operation thereof, means defining a supply passage for conveying pressure fluid to said motor, a pair of valves, one of said valves controlling the quantity of pressure fluid conveyed to said motor for thereby starting and stopping said motor and the other controlling the pressure value of said pressure fluid conveyed to said motor, said other valve normally being maintained in a position permitting a build-up in pressure value of said pressure fluid in said supply passage to a value below a predetermined pressure value and, when said pressure fluid in said supply passage exceeds said predetermined pressure value, said other valve being movable to a different position to prevent a build-up in pressure value, said one valve being adapted to retain said other valve in said different position when said motor is seized to prevent a build-up in the pressure value of the pressure fluid conveyed to said motor.

4. In a valving arrangement for a power means having a pressure fluid driven motor for driving a tool where the driven tool is subject to conditions causing seizure of said motor, the improvement comprising: means defining a supply passage for conveying pressure fluid to said motor, a pair of movable valves, one of said valves selectively controlling the quantity of pressure fluid conveyed to said motor for thereby starting and stopping said motor and the other controlling the pressure value of said pressure fluid conveyed to said motor, said other valve normally being maintained in a first position permitting a build-up in pressure value in said pressure fluid in said supply passage to a value below a predetermined value and, when said pressure fluid in said supply passage exceeds said predetermined pressure value, said other valve being movable to a different position to prevent a build-up in pressure value; means defining projection means on said one valve; means defining projection means on said other valve; said one valve being adapted to retain said other valve in said different position when said motor is seized to prevent a build-up in the pressure value of the pressure fluid conveyed to said motor, said one valve retaining said other valve in said different position when said one valve projection means is selectively moved to a position where said other valve projection means abuts thereagainst and thereby preventing movement of said other valve from said different position to said first position.

5. In a power tool, the combination of a pressure fluid driven motor subject to seizure during operation thereof, means defining a supply passage for conveying pressure fluid to said motor, a pair of movable valves, one of said valves selectively controlling the quantity of pressure fluid conveyed to said motor for thereby starting and stopping said motor and the other controlling the pressure value of said pressure fluid conveyed to said motor, said other valve normally being maintained in a position permitting a build-up in pressure value of said pressure fluid in said supply passage to a value below a predetermined pressure value and, when said pressure fluid in said supply passage exceeds said predetermined pressure value, said other valve being movable to a different position to prevent a build-up in pressure value; means defining projection means on said one valve; means defining projection means on said other valve; said one valve being adapted to retain said other valve in said different position when said motor is seized to prevent a build-up in the pressure value of the pressure fluid conveyed to said motor, said one valve retaining said other valve in said different position when said one valve projection means is selectively moved to a position where said other valve projection means abuts thereagainst and thereby preventing movement of said other valve from said different position to said first position.

References Cited in the file of this patent

UNITED STATES PATENTS

| | | |
|---|---|---|
| 2,466,972 | Slomer | Apr. 12, 1949 |
| 2,476,486 | Ferguson | July 19, 1949 |
| 2,548,339 | Berry | Apr. 10, 1951 |
| 2,636,513 | Schmid | Apr. 28, 1953 |